United States Patent
Peace et al.

(10) Patent No.: US 8,070,451 B2
(45) Date of Patent: Dec. 6, 2011

(54) MODULAR CONSTRUCTION FOR WIND TURBINE BLADE

(76) Inventors: Steven Peace, Newhaven (GB); Paul Robert Marsh, Kent (GB)

( * ) Notice: Subject to any disclaimer, the term of this patent is extended or adjusted under 35 U.S.C. 154(b) by 693 days.

(21) Appl. No.: 11/632,304

(22) PCT Filed: Jul. 12, 2005

(86) PCT No.: PCT/GB2005/002733
§ 371 (c)(1),
(2), (4) Date: Apr. 18, 2009

(87) PCT Pub. No.: WO2006/005944
PCT Pub. Date: Jan. 19, 2006

(65) Prior Publication Data
US 2009/0196755 A1    Aug. 6, 2009

(30) Foreign Application Priority Data

Jul. 12, 2004  (GB) .................................. 0415545.3
Jul. 19, 2004  (GB) .................................. 0416077.6

(51) Int. Cl.
*F01D 5/08*    (2006.01)
(52) U.S. Cl. .......... 416/226; 416/53; 416/118; 416/139; 416/227 A; 416/241 A
(58) Field of Classification Search .................. 416/23, 416/41–44, 51, 53, 11, 117–119, 132 B, 139, 416/140, 196 A, 197 A, 226, 227 A, 230, 416/22, 235, 237, 241 A
See application file for complete search history.

(56) References Cited

U.S. PATENT DOCUMENTS

| | | | | |
|---|---|---|---|---|
| 4,105,363 A | * | 8/1978 | Loth | 416/41 |
| 4,171,929 A | | 10/1979 | Allison | |
| 4,293,279 A | * | 10/1981 | Bolie | 416/227 A |
| 4,389,162 A | | 6/1983 | Doellinger et al. | |
| 4,408,958 A | * | 10/1983 | Schacle | 416/237 |
| 4,430,044 A | * | 2/1984 | Liljegren | 416/119 |
| 4,483,657 A | * | 11/1984 | Kaiser | 416/51 |
| 5,375,324 A | * | 12/1994 | Wallace et al. | 29/889.21 |
| 5,951,249 A | * | 9/1999 | Aylor | 416/42 |
| 6,800,956 B2 | * | 10/2004 | Bartlett | 290/55 |
| 7,841,835 B2 | * | 11/2010 | Bagepalli et al. | 416/226 |

FOREIGN PATENT DOCUMENTS

| | | |
|---|---|---|
| DE | 30 08 531 | 9/1981 |
| DE | 34 35 458 | 6/1986 |
| DE | 38 25 241 | 10/1989 |
| EP | 1 184 566 | 3/2002 |
| GB | 2 286 637 | 8/1995 |
| WO | WO 03/104648 | 12/2003 |

OTHER PUBLICATIONS

International Search Report, Nov. 10, 2005.

* cited by examiner

*Primary Examiner* — Michael Lebentritt
(74) *Attorney, Agent, or Firm* — Michael D. Eisenberg

(57) ABSTRACT

A vertical axis wind turbine including a blade having a modular structure, comprising at least two connectable blade sections. Each section has an upper and lower panel with a cavity formed therebetween through which extends a spar.

14 Claims, 5 Drawing Sheets

MODULAR CONSTRUCTION FOR WIND TURBINE BLADE

The present invention relates to a wind turbine and more especially to an improved configuration for a vertical axis wind turbine.

Wind turbines are having to continually increase in size to provide the levels of power output targets set for the wind turbine industry in order to compete with conventional methods of electricity production. It is anticipated that horizontal axis wind turbine technology should peak in the next few years, largely due to the viable limitations of the blades and their effects on the machine. It is becoming increasingly apparent that the weight of the blade is not proportional to the size and power rating of the machine.

The applicant has established over the years many advantages that vertical axis wind turbines enjoy over more conventional wind turbines. Such advantages include eliminating the cyclically varying stresses which the blades of conventional horizontal turbines experience. Although vertical axis turbines do experience some varying aerodynamic loads, the resulting stresses are relatively constant and do not increase substantially with turbine size. Consequently, vertical axis wind turbines can be constructed much larger than can be viably considered for horizontal axis turbines. Any marginal difference in efficiency is outweighed by their higher run on wind speeds, their economies of scale and the reduction in capital plant costs per kW produced.

Several designs of vertical axis wind turbines are known and have been employed to generate electricity. The applicant's earlier patent GB 2286637 discloses a vertical axis wind turbine capable of being mounted on or to an existing industrial chimney, concrete tower or similar structure.

The present invention sets out to provide a vertical axis wind turbine having an improved blade configuration thereby having improved efficiency.

According to one aspect there is provided, a blade for a vertical axis wind turbine, the blade having a modular structure comprising at least two blade sections, each section having upper and lower panels with a cavity formed therebetween through which extends a spar section, the spar section of one blade section being connectable to a spar section of a further blade section thereby to connect the blade sections together.

The invention will now be described by way of example with reference to the accompanying diagrammatic drawings, in which:—

FIG. 1 shows a cross-section view of a wind turbine blade section 10 constructed in accordance with the present invention.

Figure 1:
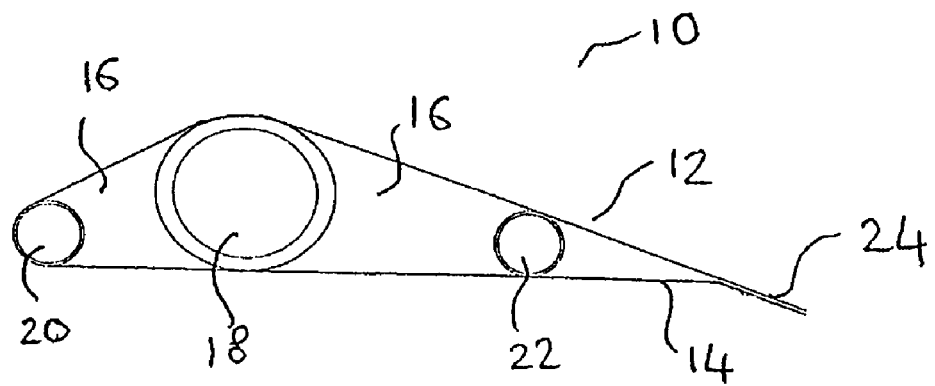
FIG. 1 is a side cross-section view of a blade section of a wind turbine constructed in accordance with the present invention.

The blade section 10 comprises top and bottom pultruded panels 12, 14 engaged at their ends to provide a cavity 16 therebetween. A spar 18 extends along the length of the blade section 10 within the cavity 16. The spar 18 is located towards one side of the cavity 16 between the top and bottom pultruded panels 12, 14. The top pultruded panel 12 extends over and around the spar 18 to widen the cavity 16 at that point. Two tensioning tubes 20, 22 extend along the length of the blade section 10 one on either side of the spar 18.

One tensioning tube 20 is located at an end of the cavity 16 such that the tensioning tube 20 forms part of the join of the top and bottom panels 12, 14 at that end. The other tensioning tube 22 is located towards the other end of the cavity 16 but here, the panels 12, 14 extend beyond the tensioning tube 22 to form a trailing edge 24 to the blade structure.

The spar 18 is larger in diameter than the tensioning tubes 20, 22. The tensioning tubes 20, 22 are of generally equal diameter. The spar 18 and the tensioning tubes 20, 22 are formed from filament or bandage wound carbon fibre tubes.

The profile of the blade section 10, and hence a wind turbine blade made of a plurality of linked blade sections is therefore defined by the way in which the top and bottom panels 12, 14 extend over the spar 18 and tensioning tubes 20, 22. The free space within the cavity 16 between the panels 12, 14 is filled with foam.

The profile of the blade is designed to provide high lift.

The features of high lift include, a small radius leading edge, a generally flat, or slightly curved underside, a generally humped back and an extended trailing edge which extends below the cord line.

Figure 2:
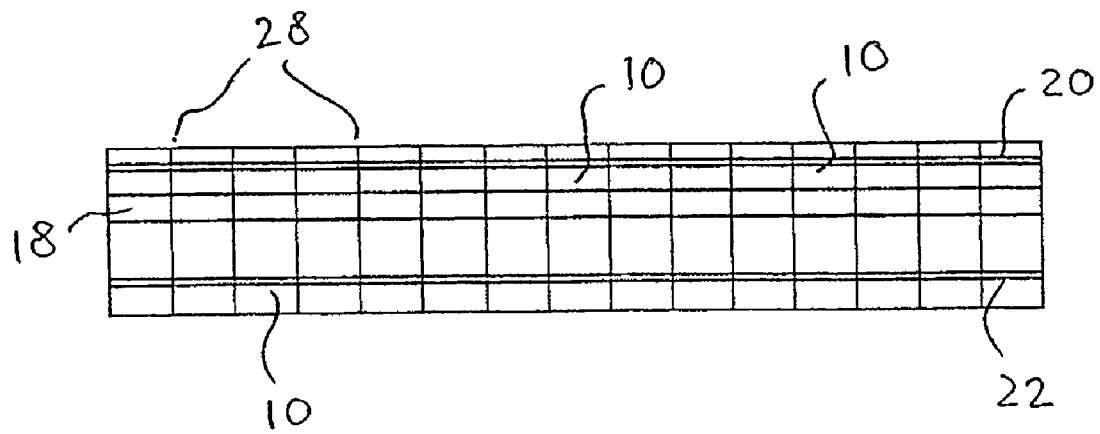
FIG. 2 is a plan cross-section view of a blade comprising a plurality of blade sections of FIG. 1.

FIG. 2 illustrates a blade 26 constructed from a plurality of linked blade sections 10. The blade sections 10 are linked together in such a way that the spar 18 and the tensioning tubes extend continuously along the entire length of the blade 26. Each blade section 10 has a plurality of laterally-extending ribs 28, made of glass fibre or similar material to provide strength to each section 10 and hence the entire blade structure 26.

Figure 3:
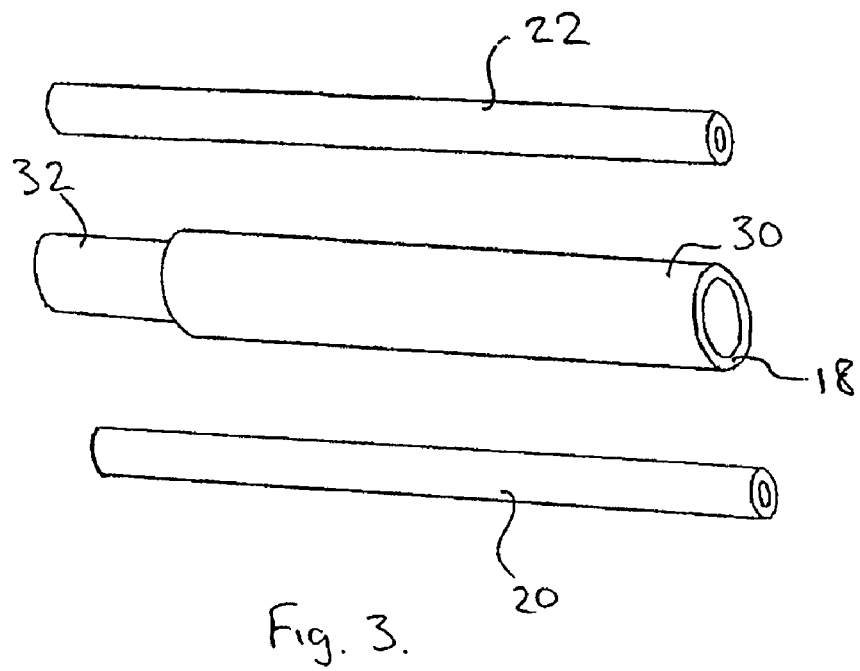
FIG. 3 is a perspective view of a central core and tensions tubes forming part of the blade of FIG. 2.
Figure 4:
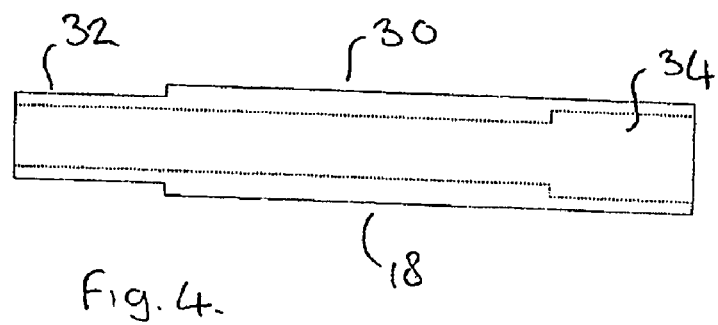
FIG. 4 is plan cross-section view of the central core of FIG. 3.
Figure 5:
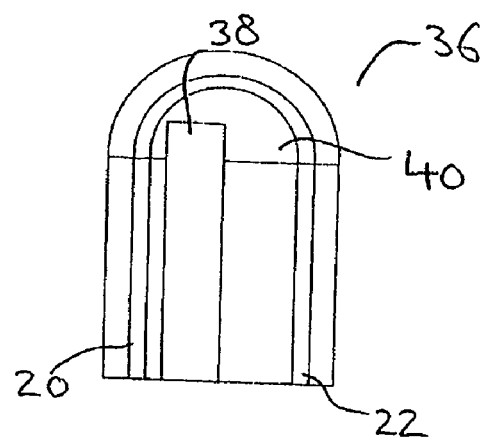
FIG. 5 is a side cross-section view of an end cap of the blade of FIG. 2.

The way in which the spars 18 of each blade section 10 are linked attached together will now be described with reference to FIGS. 3 and 4.

As can be seen from these Figures, the spar 18 of each blade section 10 is formed from hollow tubular structure having a main portion 30 of uniform diameter and an end portion 32 of reduced diameter. One end of the main portion 30 has an internal tubular recess 34 equal to the outer diameter of the end portion 32 (see FIG. 4). This allows the end of an adjacent spar 18 of an adjacent blade section 10 to be located within the recess 34 of the main portion 30. The end portion 32 of the spar sections 18 may be tapered.

The width of the panels 12, 14 of each blade section 10 is equal to the length of the main portion 30 of the spar 18 extending between those panels 12, 14 such that, when two spars 18 of adjacent sections 10 are attached together in the manner described above, the edges of the panels 12, 14 of the two connected blade sections 10 lie flush against each other. The connection mechanism also ensures that the tensioning tubes 20, 22 are aligned.

The end blade section 10 of the blade 26 has an end cap 36 connected thereto. The end cap 36 comprises a semi-circular panel which has a spar 38 extending partly into a cavity 40 formed by the structure of the end cap 36. The spar 38 is connected to an adjacent spar 18 of the end blade section 10 in the manner described above. The tensioning tubes 22, 24 continue around the end cap 36 to provide a continuous loop. The end cap 36 may include a flashing beacon to provide a warning to low flying aircraft of the presence of the wind turbine and the height reached by the blades 10.

Once the entire blade 26 is constructed (the length of the blade 26 being simply controlled by the number of blade sections 10 connected together) a tensioning cable (not shown) is fed through the tensioning tubes 20, 22 which is then tightened to provide a tensioning stress across the entire blade 26 for strength. The tensioning tubes 20, 22 also help to prevent twisting of the blade 26 in use.

The blade profile may include other features that are known, for example, in the aircraft technology, to provide high lift.

The blade 26 may, for example, incorporate a leading edge slat whereby an aerofoil section of reduced cord (when compared to the main aerofoil section) is attached to the leading edge of the main blade causing the aerodynamic characteristics to be changed thereby increasing the lift coefficient of the blade structure 26.

The blade 26 may incorporate a trailing edge slat attached to the trailing edge 24 of the blade 26 to provide life in the same way as above.

In a further embodiment (not shown), the blade 26 may incorporate both a leading edge flap and a trailing edge flap.

The blade 26 may incorporate an end plate or tip wing. The end plate which is attached to the end of the blade 26 has a much larger cross-sectioned profile to the blade 26 and aids control of the turbulent air as it flows over the extremities of the blade 26.

Various constructions of a wind turbine carrying blades 26 of the form and structure detailed above will now be described with reference to FIGS. 6 to 11.

Figure 6:
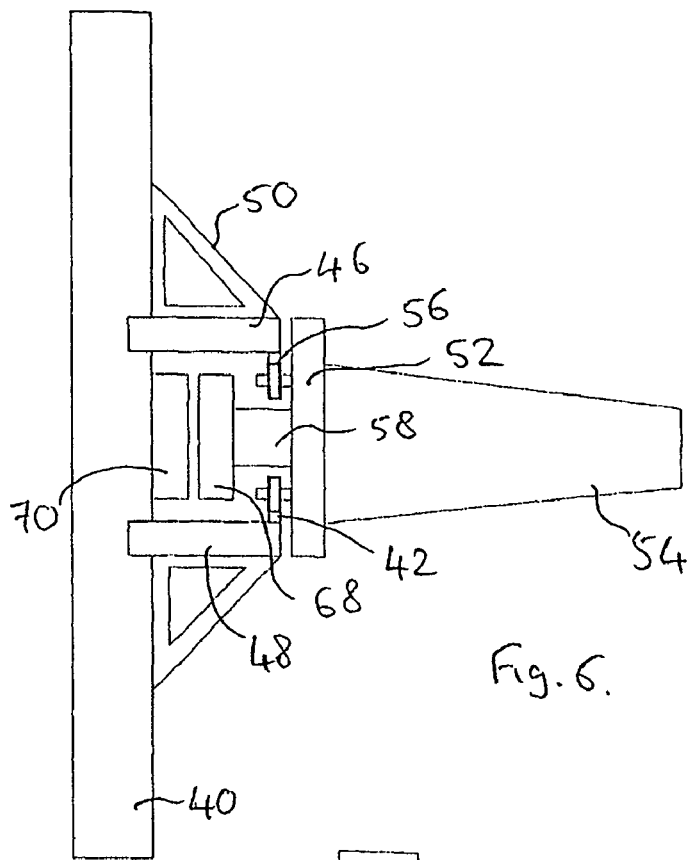
FIG. 6 is a side cross-section view of a first wind turbine construction for mounting on a wall.

The first construction, shown in cross-section in FIG. 6, is a wall-mounted arrangement. Here, a support structure 40, such as an existing industrial chimney, concrete tower or similar structure has a circumferential track 42 secured thereto. The track 42 is secured to the support structure 40 by a concrete ring beam 44 which extends around the support structure 40. The concrete ring beam has upper and lower support beams 46, 48 that are spaced-apart. The track 42 extends inwardly from the ends of each support beam 46, 48 of the ring beam 44. The support beams 46, 48 are mounted on to the support structure 40 by a cantilever frame 50. A rotor arm ring 52 which carries a blade arm 54 of the form and structure described above, is connected to support rollers 56 connected to the track 42 allowing rotational movement of the rotor arm ring 52, and thus the turbine blade 56 around the track 42 and thus around the support structure 40.

A dampened power take off arm 58 extends inwardly from the rotor arm ring 48 towards the support structure. The distal end of the take off arm 58 carries a first coil 60 which faces opposite a second fixed coil 62 circumferentially mounted on the support structure 40.

Figure 7:
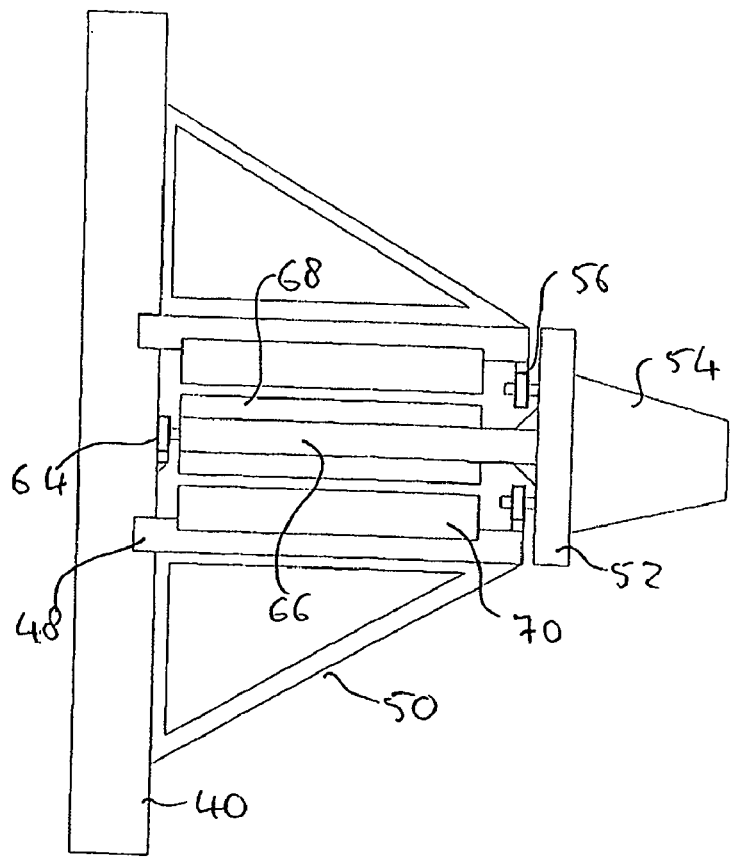
FIG. 7 is a side cross-section of a second wind turbine construction.
Figure 8:
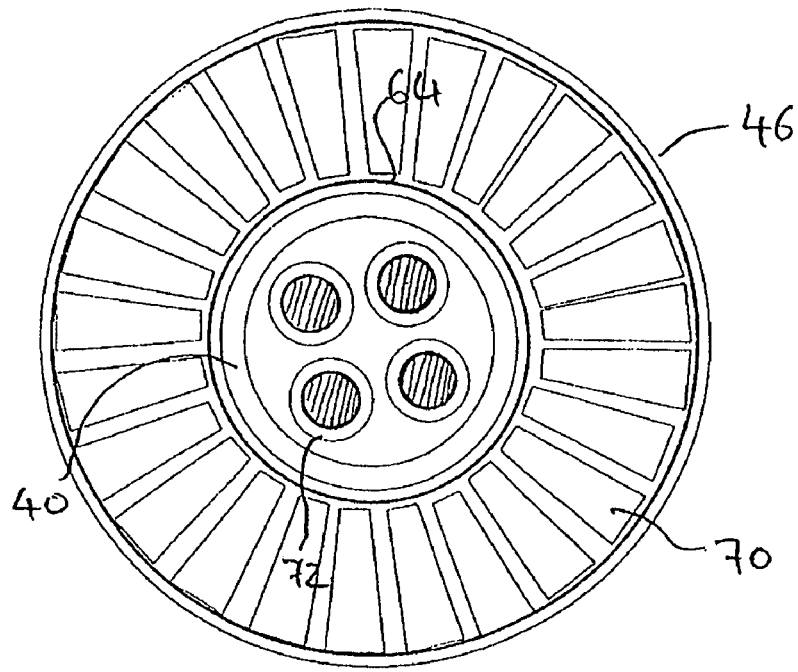
FIG. 8 is plan view of the construction of FIG. 7.

FIGS. 7 and 8 showing an alternative construction. Here, a second track 64 is provided around the surface of the support structure 40. The rotor ring arm 52 is connected to the second track 64 via an interface connection arm 66 which carries a permanent magnet 68 along a substantial part of its length. Fixed coils 70 are embedded into the inner surfaces of the beams 46, 48 of the ring beam 44 rather than one being mounted around the support structure 40.

The support structure may have flues 72, as can be seen in FIG. 8.

Figure 9:
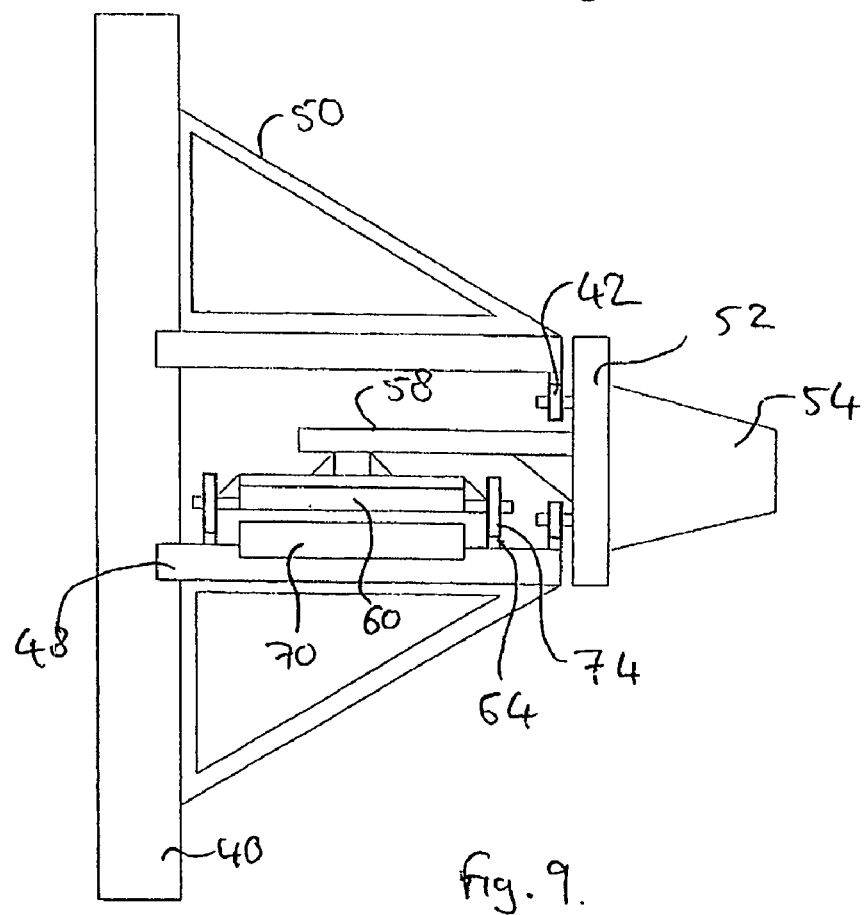
FIG. 9 is a side cross-section view of a third wind turbine construction.

In the construction of FIG. 9, the fixed coil 70 is embedded into the inner surface of the lower beam 48 of the ring beam 44. The second track 64 extends around inner surface of the lower beam 48 either side of the fixed coil 70. The power take off arm 58 carrying the coil 60 is attached to the track 64 via rollers 74 allowing the power take off arm 58 to rotate the arm 58 around the second track 60. At the same time, the rotor arm ring 52 and blade arm 54 rotate around the first track 42 extending inwardly from the ends of the upper and lower beams 46, 48 of the concrete ring beam 44.

Figure 10:
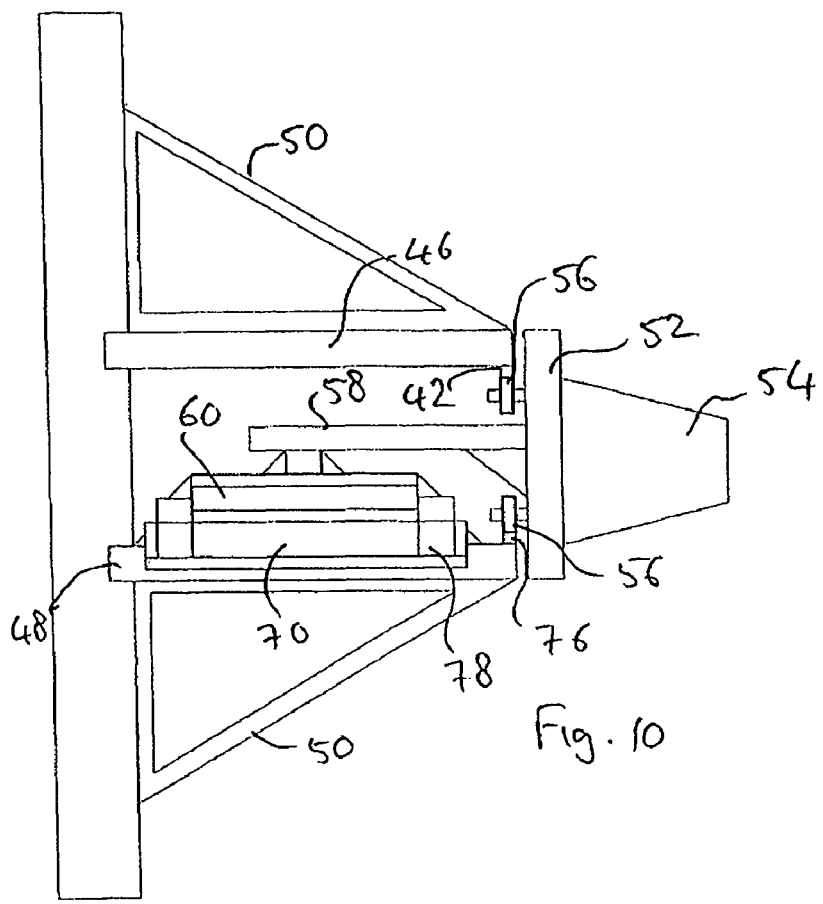
FIG. 10 is a side cross-section view of a fourth wind turbine construction.
Figure 11:
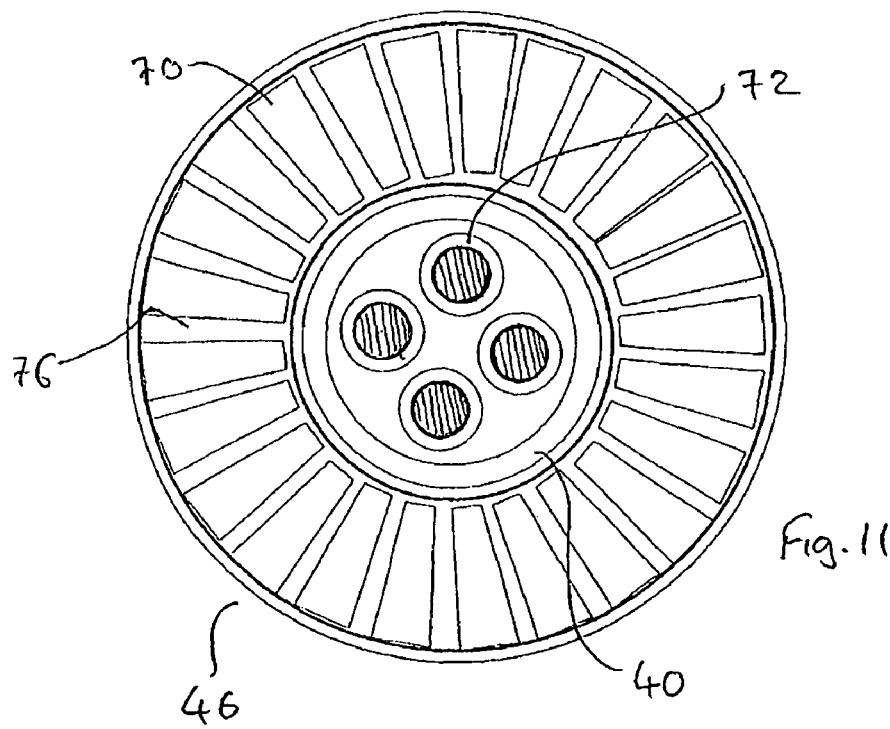
FIG. 11 is a plan view of the construction of FIG. 10.

The construction of FIGS. 10 and 11 use a fluid bed arrangement. Here, the fixed coil 70 is located within a fluid bed 76 mounted on the inner surface of the lower beam 48 of the ring beam 44. The permanent magnet 60 carried on the distal end of the power take off arm 58 is located within a structure carrying floats 78 such that the structure floats above the fluid bed 76 to retain the permanent magnet 60 directly above the fixed coil 70. The fluid within the fluid bed 76 provides cooling to the system in use.

In each construction, the upper and lower ring beams 46, 48 act as a stator and generator to provide and store electricity. Through experiments to date it has been found that providing a gap of approximately 2 to 20 mm between the ring beams provides the best results.

It will be appreciated that the foregoing constructions are mere examples of ways in which the wind turbine assembly can be mounted onto support structure such as chimneys or towers. Although, for example, the constructions refer to coils, it is clear that these could be replaced by permanent magnets.

Any number of blades may be mounted to the support structure. Preferably an odd number of blades are mounted.

It has been found that, for the turbine to work at maximum efficiency, each blade should be mounted at negative pitch or at a negative fixing angle to the bracing arm. A negative angle of between 5 and 25 degrees, and most particularly around 20 degrees, has been found provide the most efficient results to date.

The above described embodiment has been given by way of example only, and the skilled reader will naturally appreciate that many variations could be made thereto without departing from the scope of the present invention.

The invention claimed is:

1. A blade for a vertical axis wind turbine, the blade having a modular structure comprising at least two blade sections, each section having upper and lower panels with a cavity formed therebetween through which extends a spar section, the spar section of one blade section being connectable to a spar section of a further blade section thereby to connect the blade sections together.

2. A blade according to claim 1, wherein the spar of each section is located towards one side of the cavity between the upper and lower panels.

3. A blade according to claim 1, wherein each blade section further comprises two tensioning tube sections located either side of the spar, through which a tensioning cable can extend, each tensioning tube section of the blade section being connectable with respective tensioning tube sections of another blade section.

4. A blade according to claim 3, wherein one of the tensioning tube sections is located at an end of the cavity such that the tube section forms part of the join of the top and bottom panels at that end.

5. A blade according to claim 4, wherein the other tensioning tube section of each blade section is located towards the other end of the cavity, wherein the upper and lower panels extend beyond that tube section to form a trailing edge to the blade structure.

6. A blade according to claim 1, wherein the free-space within the blade structure is filled with foam.

7. A blade according to claim 1, wherein each blade section has at least one laterally extending rib.

8. A blade according to claim 7, wherein the or each rib of each blade section is made of glass fibre or similar material.

9. A blade according to claim 1, having an end blade section which has an end cap connected thereto.

10. A blade according to claim 9 wherein the end cap includes a tensioning tube section to provide a continuous loop along the blade.

11. A blade according to claim 9, wherein the end cap has a light located thereon.

12. A blade according to claim 1, wherein the profile of the blade is designed to provide high lift and low drag.

13. A wind turbine assembly comprising at least one blade in accordance with claim 1 mounted to a support structure, wherein the or each blade is mounted at a negative fixing angle to a bracing arm of the support structure.

14. A wind turbine assembly according to claim 13, wherein the or each blade is mounted at a negative fixing angle of between 5 and 25 degrees.

* * * * *